(12) United States Patent
DeHerrera

(10) Patent No.: US 11,871,738 B2
(45) Date of Patent: Jan. 16, 2024

(54) HOOK ALIGNMENT DEVICE

(71) Applicant: Michael DeHerrera, Santa Clarita, CA (US)

(72) Inventor: Michael DeHerrera, Santa Clarita, CA (US)

(*) Notice: Subject to any disclaimer, the term of this patent is extended or adjusted under 35 U.S.C. 154(b) by 250 days.

(21) Appl. No.: 17/000,895

(22) Filed: Aug. 24, 2020

(65) Prior Publication Data
US 2022/0053745 A1 Feb. 24, 2022

(51) Int. Cl.
| | | |
|---|---|---|
| *A01K 85/16* | (2006.01) | |
| *A01K 85/00* | (2006.01) | |
| *A01K 91/03* | (2006.01) | |
| *A01K 83/00* | (2006.01) | |

(52) U.S. Cl.
CPC .............. *A01K 85/16* (2013.01); *A01K 85/00* (2013.01); *A01K 91/03* (2013.01); *A01K 83/00* (2013.01)

(58) Field of Classification Search
CPC ........ A01K 85/00; A01K 85/16; A01K 85/18; A01K 91/03
USPC .................. 43/42.04, 42.44, 42.48
See application file for complete search history.

(56) References Cited

U.S. PATENT DOCUMENTS

| | | | | |
|---|---|---|---|---|
| 2,549,463 A | * | 4/1951 | Hansen ................. | A01K 85/16 43/42.04 |
| 2,577,466 A | * | 12/1951 | Jones ..................... | B29C 66/69 43/44.83 |
| 2,611,209 A | * | 9/1952 | Pond ..................... | A01K 85/16 43/42.48 |
| 2,746,200 A | * | 5/1956 | Dale ..................... | A01K 85/16 43/42.04 |
| 2,829,462 A | * | 4/1958 | Stokes ................... | A01K 85/16 D22/129 |
| 2,835,068 A | * | 5/1958 | Latham ................. | A01K 85/16 43/42.31 |
| 3,483,651 A | * | 12/1969 | Borger ................... | A01K 85/16 D22/128 |

(Continued)

FOREIGN PATENT DOCUMENTS

| | | | | |
|---|---|---|---|---|
| JP | H10248443 A | * | 9/1998 | |
| JP | 3087126 U | * | 7/2002 | |

(Continued)

OTHER PUBLICATIONS

Translation of JP 2016-214200 (Year: 2016).*

(Continued)

*Primary Examiner* — Darren W Ark
(74) *Attorney, Agent, or Firm* — Knobbe Martens Olson & Bear, LLP

(57) ABSTRACT

Methods for aligning a fishing hook to a fishing lure are disclosed herein. The fishing hook may be attached to the fishing lure either directly or with the use of a connector components. The fishing hook may be aligned such that the longitudinal axis of the hook is inline with or parallel to the longitudinal axis of the fishing lure. The alignment may be secured via an encasing method, where the lure, connector components, and hook are secured by wrapping the connection mechanisms to limit movement of the hook relative to the lure. In other embodiments, the alignment may be secured via a woven method, where the connection mechanisms are secured by interweaving a rigid but pliable member through each connection mechanism component.

5 Claims, 4 Drawing Sheets

(56) References Cited

U.S. PATENT DOCUMENTS

| | | | | |
|---|---|---|---|---|
| 3,935,660 | A | * | 2/1976 | Plew ................. A01K 85/01 43/42.31 |
| 4,336,087 | A | * | 6/1982 | Martuch ............. G09F 3/205 156/85 |
| 4,477,994 | A | * | 10/1984 | Erickson ............ A01K 85/16 43/42.48 |
| 4,569,148 | A | * | 2/1986 | Kemp ................. A01K 83/00 43/43.16 |
| 4,823,503 | A | * | 4/1989 | Tesch ................ A01K 85/16 43/42.04 |
| 5,001,856 | A | * | 3/1991 | Gentry ............... A01K 85/01 43/42.31 |
| 5,142,807 | A | * | 9/1992 | Sweet ................ F16B 2/10 24/493 |
| 5,596,831 | A | * | 1/1997 | McWethy, Jr. ...... A01K 85/00 43/42.36 |
| 5,950,350 | A | * | 9/1999 | Norton ............... A01K 85/02 43/42.42 |
| 6,023,877 | A | * | 2/2000 | Mueller .............. A01K 97/06 43/25 |
| 6,035,574 | A | * | 3/2000 | Ware ................. A01K 85/01 43/42.31 |
| D501,039 | S | * | 1/2005 | Duncan ............... D22/144 |
| 7,107,718 | B1 | * | 9/2006 | Alajajyan ........... A01K 85/02 43/42.39 |
| D589,587 | S | * | 3/2009 | Stacy ................ D22/144 |
| 10,426,149 | B1 | * | 10/2019 | Coxey ................ A01K 85/14 |
| 10,645,913 | B1 | * | 5/2020 | Coxey ................ A01K 95/02 |
| 2001/0013193 | A1 | * | 8/2001 | Schultz .............. A01K 85/01 43/17.6 |
| 2010/0218413 | A1 | * | 9/2010 | Simmons ............. A01K 85/00 43/42.31 |
| 2010/0263259 | A1 | * | 10/2010 | Cuthbert ............ A01K 85/08 43/42.34 |
| 2013/0145674 | A1 | * | 6/2013 | Nichols .............. A01K 91/03 43/42.36 |

FOREIGN PATENT DOCUMENTS

| | | | | |
|---|---|---|---|---|
| JP | 2004159576 | A | * | 6/2004 |
| JP | 2010022298 | A | * | 2/2010 |
| JP | 2010098961 | A | * | 5/2010 |
| JP | 5672404 | B1 | * | 2/2015 |
| JP | 5818190 | B1 | * | 11/2015 |
| JP | 2016214200 | A | * | 12/2016 |

OTHER PUBLICATIONS

Screen capture from the YouTube video clip entitled "Plopper Heat Shrink Replacement—How To." 1 page, posted Jan. 20, 2020 by user "Today's Angler". Retrieved from Internet: <https://www.youtube.com/watch?v=NmwKcJsjJfs>. (Year: 2020).*

Water Chopper HD, 3 pages; Available web site: <https://web.archive.org/web/20190406140317/https://leelures.com/products/water-chopper-hd>; Capture of a website at www.leelures.com on Apr. 6, 2019 by archive.org (AKA Internet Archive Wayback Machine); downloaded on Apr. 21, 2023. (Year: 2019).*

White, Sam. "Rigging Lures for Giant Blue Marlin", 9 pages; published on Nov. 14, 2017; Available web site: <https://www.marlinmag.com/rigging-lures-blue-marlin/>; downloaded on Apr. 21, 2023. (Year: 2017).*

Our Favorite Jigs and some Tips and Tricks!, 17 pages; Available web site: <https://web.archive.org/web/20200201111855/https://usangler.com/best-ice-fishing-lures-jigs/>; Capture of a website at www.usangler.com on Feb. 1, 2020 by archive.org (AKA Internet Archive Wayback Machine). (Year: 2020).*

AnglingTimes, How to Tie the Perfect In-line Big Carp Fishing Rig, https://www.anglingtimes.co.uk/advice/rigs/articles/how-to-tie-the-perfect-in-line-big-carp-fishing-rig/, Sep. 8, 2014.

* cited by examiner

HOOK ALIGNMENT DEVICE

BACKGROUND

Sport and recreational fishing are both immensely popular. Among sport and recreational fishing, lure fishing using a rod and reel is one of the most popular. Typically, an artificial fishing lure or hook with live bait is connected to the fishing line to attract a fish and to bait it into biting the fishing lure or hook.

SUMMARY

Present lure designs allow for the hooks on the lure to freely move up, down, and sideways, as well as drift downward when the lure is stopped or otherwise not in motion. Almost all existing fishing lures have non-fixed connecting sections that allow the lure's hooks to freely move within each section's boundary circumference. However, this makes it much more difficult to set the hook when a fish attacks the lure because the hook may not be oriented to catch the fish's mouth. Most predatory fish attack prey from below or from the tail, so it can be desirable for the hook to be oriented in the same direction as their mouths. Allowing the hook to have free movement substantially increases the chances of a hook moving before the fish can be detected or before the hook is set, resulting in a lost fish. When a lure is paused during the retrieve, the hooks usually drift downward due to gravity and may not be aligned. It would be more desirable for all components to be aligned for immediate and best hook penetration.

On the other hand, a fully rigid connection between a lure and its hook may not be desirable because the fish may use the rigid connection as a fulcrum to release from the lure. Thus it may be more desirable to have a lure in which the hook is connected to maintain proper alignment for an immediate hookset, but not so rigidly attached that the fish can use the rigid connection to throw the hook and escape.

The present disclosure relates to methods for maintaining a fishing hook's alignment relative to a fishing lure. The method of the present disclosure may include a lure with one or more connecting sections used for connecting one or more fishing hooks. Each connecting section may include multiple sub-components such as connector rings or loop segments. An alignment method or kit is provided for the lure, which fixes the position of the hook relative to the lure. Once aligned and fixed, the hook will not substantially move out of alignment absent significant external force, e.g., force that is beyond the normal forces applied from traveling through water. For example, the hook will move no more than 5 degrees or no more than 1 degree when traveling through water.

In some configurations, one or more fishing hooks are aligned with the lure by encasing or wrapping the connecting section with a certain material to fix it in place. The material may require an additional step to adhere it to the connecting section, such as applying heat or adhesive. Additionally, the one or more hooks may be aligned parallel to, or along the same longitudinal axis as, the lure.

In other configurations, alignment can be achieved by interweaving a pliable but rigid elongated member, such as wire, with the connecting section.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

Figure 1:
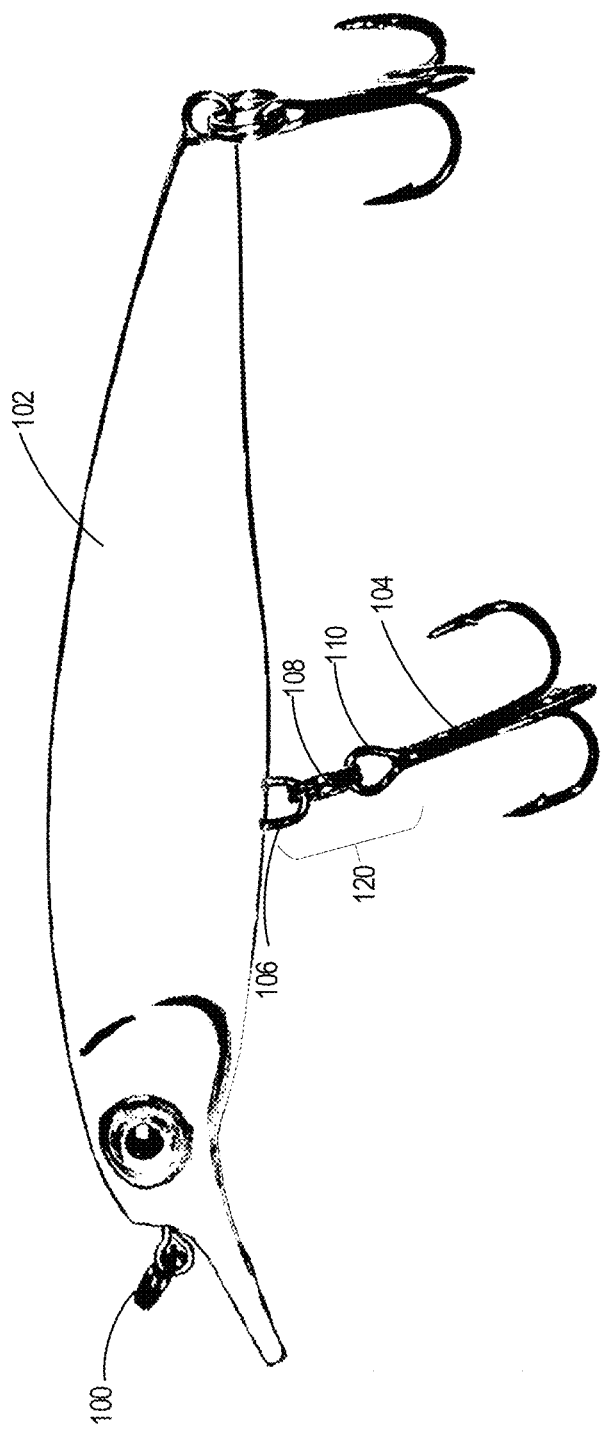
FIG. 1 shows a common minnow-shaped lure of the prior art.

The minnow shape depicted in FIG. 1 is an example lure with which the present alignment methods and kits may be used, though the alignment methods and kits can work with lures of any shape. The lure may include a lure body 102 having a front end and tail end. A connecting section 100 may be used to connect the lure to a fishing line and may be provided on the front end of the lure. A connection mechanism 120, for example including one or more loop segments 106, 108, 110, are attached to said lure body 102 and connected to one or more fishing hooks 104.

The one or more lure loop segments 106 may connect to the hook loop segments 110 of the one or more fishing hooks 104 either directly, or through use of connector rings 108. The type of connections used between a lure body 102 and its one or more fishing hooks 104 may vary between each individual hook for the same lure. Additionally, multiple types of hooks may be used on the same lure at the same time. The various loop segments 106, 110 may take different forms, and may not be actual loops. The connector rings 108 may take different forms, and may not be actual rings.

Figure 2:
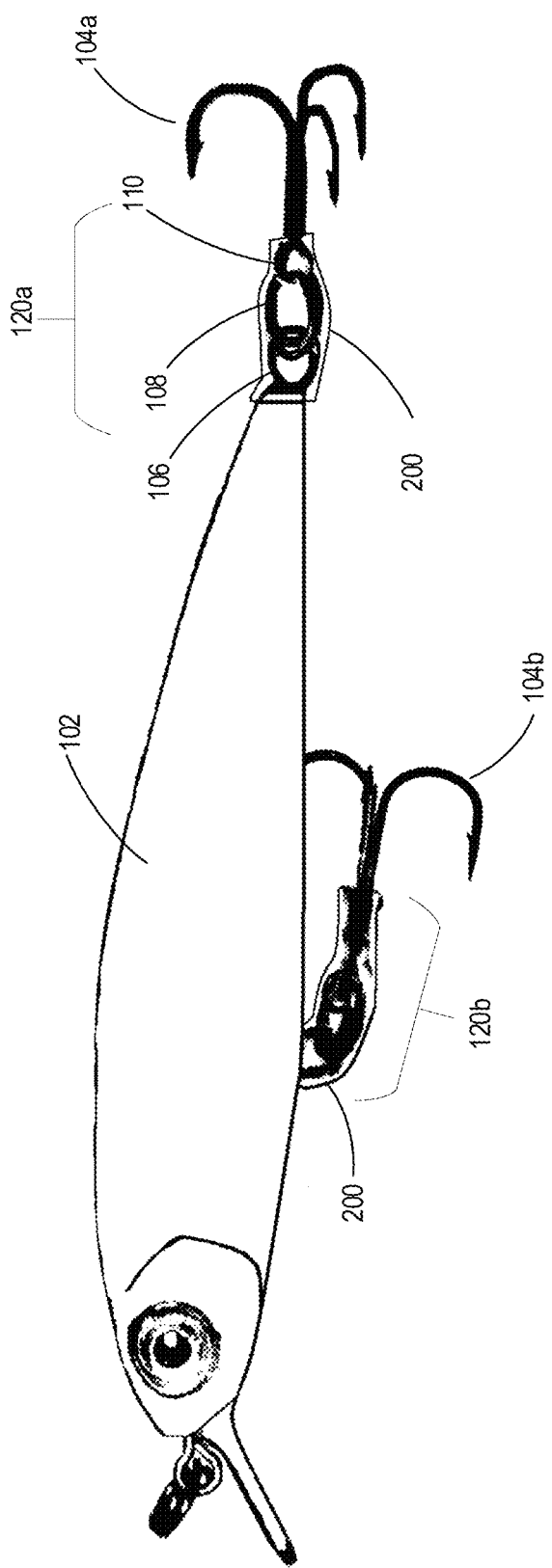
FIG. 2 shows a side view of a lure with the fishing hooks aligned with the lure.

FIG. 2 depicts a lure utilizing a configuration of the alignment method. In this configuration, the one or more fishing hooks 104 can be aligned with the lure body 102. For example, the one or more fishing hooks 104 may include a first fishing hook 104a connected to a tail end of the lure body 102 by a first connection mechanism 120a and a second fishing hook 104b connected to a bottom side of the lure body 102 by a second connection mechanism 120b.

Alignment in FIG. 2 is depicted through the application of an encasing member 200, however, alignment may be achieved through other configurations, including those disclosed herein. Once aligned and fixed, the hook may not substantially move out of alignment absent significant external force, e.g., force that is beyond the normal forces applied from traveling through water.

In the configuration of FIG. 2, the connection mechanisms 120a, 120b and/or the fishing hooks 104a, 104b are substantially aligned with the lure body 102 such that the longitudinal axis of a fishing hook 104a, 104b is parallel to the longitudinal axis of the lure body 102, which extends from its front end to its tail end. For example, the fishing hooks 104a, 104b may be no more than 10 degrees or no more than 5 degrees offset from the longitudinal axis of the lure body 102. Similarly, in some configurations where the fishing lure has a longer vertical axis than its horizontal axis, the fishing hook 104a, 104b may be substantially aligned with the lure body 102 such that the latitudinal axis of the fishing hook 104a, 104b may be parallel to the latitudinal axis of the lure body 102. For example, the fishing hooks 104a, 104b may be no more than 10 degrees or no more than 5 degrees offset from the latitudinal axis of the lure body 102. In some configurations, the alignment of the fishing hooks 104a, 104b with the lure body 102 may not be in a parallel orientation, but at another orientation or angle. In such configurations, the angle between the fishing hooks 104a, 104b and the lure body 102 may be as large as 90 degrees, such that the alignment of the fishing hooks 104a, 104b with the lure body 102 may be in a perpendicular orientation.

A longitudinal axis of the first fishing hook 104a may be substantially aligned with a longitudinal axis of the second fishing hook 104b. When the fishing hooks 104a, 104b are aligned with the lure body 102, the longitudinal axis of the first fishing hook 104a may be no more than 10 degrees or no more than 5 degrees offset from the longitudinal axis of the second fishing hook 104b.

As illustrated, the first fishing hook 104a and the corresponding connection mechanism 120a may be substantially aligned with the longitudinal axis of the lure body 102. The connection mechanism 120b corresponding to the second fishing hook 104b may be fixed in a bent configuration. As shown in FIG. 2, the second connection mechanism 120b may be fixed in a bent configuration such that the second fishing hook 104b extending from the bottom side of the lure body 102 may be substantially aligned with the longitudinal axis of the lure body 102.

Figure 3A:
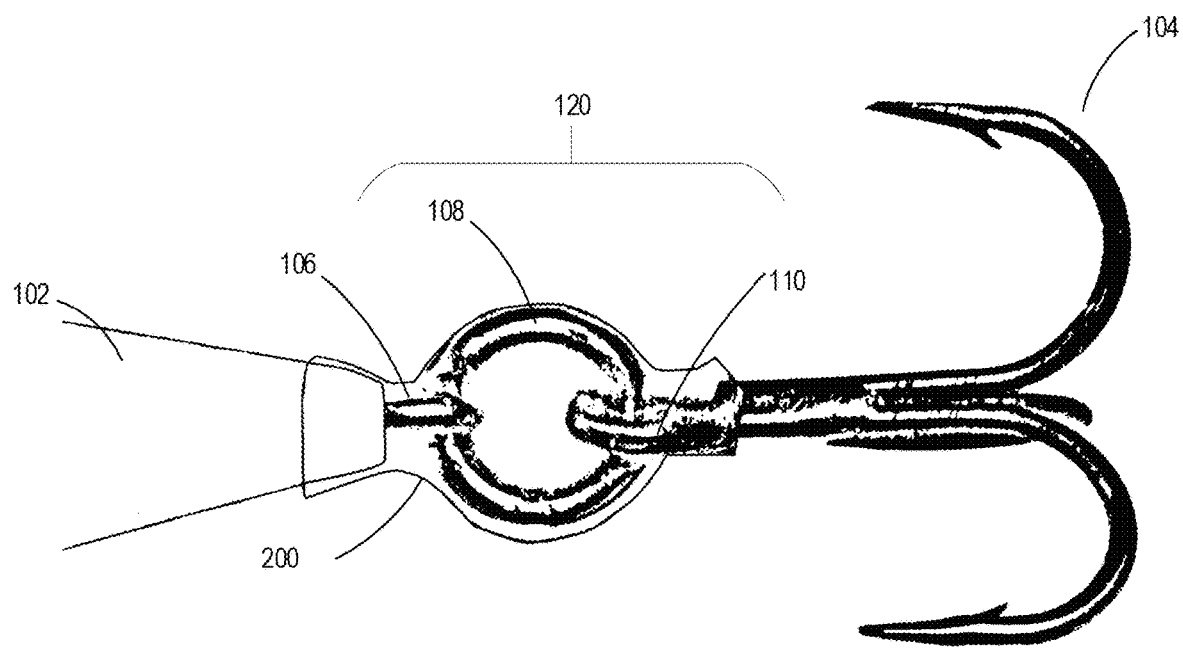
FIG. 3A shows an aerial view of an encasing member coupled to a fishing lure connection mechanism.
Figure 3B:
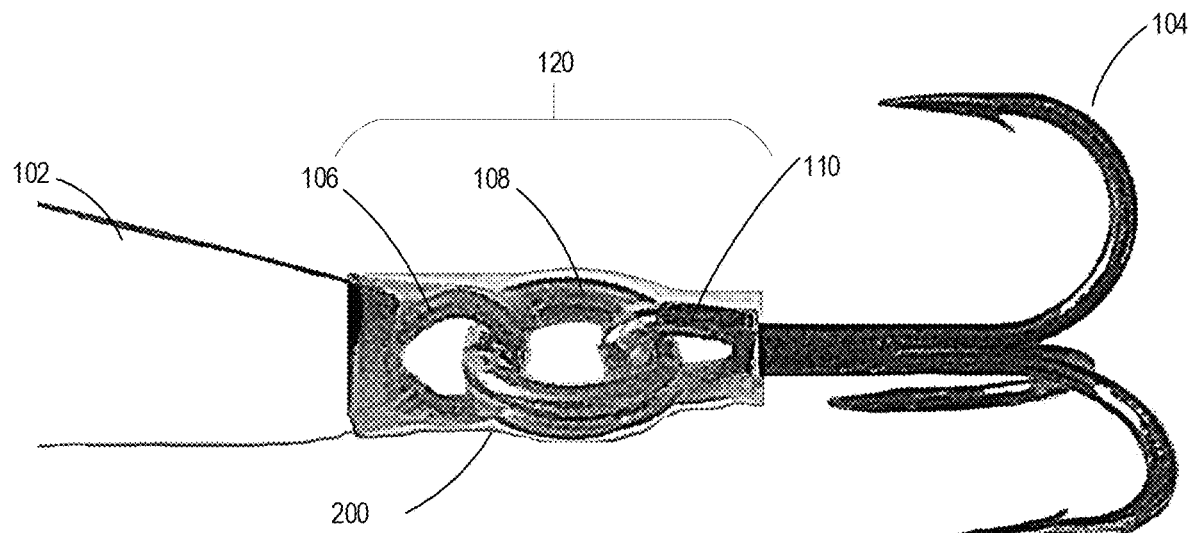
FIG. 3B shows an angled view of an encasing member coupled to a fishing lure connection mechanism.

FIG. 3A and FIG. 3B depict detailed views of a configuration that includes an encasing member 200, which aligns the fishing hook 104 with the lure body 102. The encasing member 200 may surround at least a portion of the lure body 102, the connection mechanism 120 and/or the fishing hook 104. For example, the encasing member 200 may surround a tail end of the lure body 102, the connection mechanism 120, and a portion of the fishing hook 104. As illustrated, the encasing member 200 may wrap around any combination of the lure loop segment 106, connector ring 108, hook loop segment 110, and/or any other connecting member between the lure body 102 and the fishing hooks 104.

The encasing member 200 may utilize any material that adheres to the components and holds the components in a set position relative to each other. For example, the material of the encasing member 200 may include one or more of: shrink wrap, Polyolefin, fluoropolymer, PVC, neoprene, silicone elastomer, shoe goo, liquid silicone, glue, and/or other forms of polymer wrapping or tubing. In some configurations, the encasing member 200 may be applied to the lure through an adhering process. This process may include applying heat and/or adhesive to the encasing member 200. In other configurations, the encasing member 200 may be applied without an adhering step.

Figure 4A:
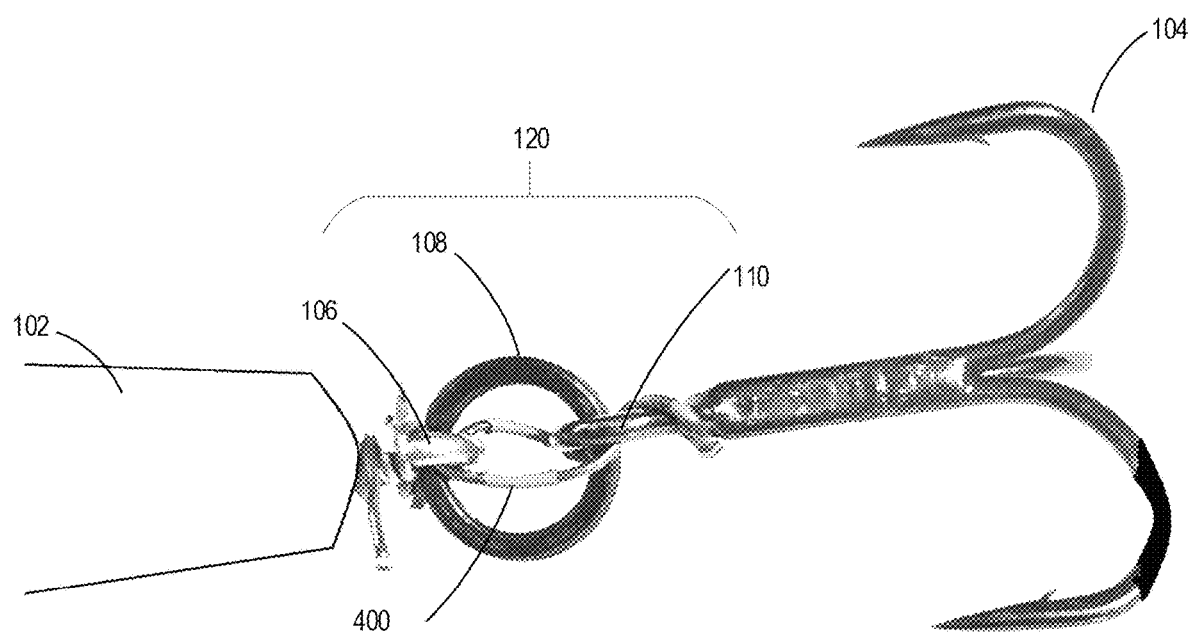
FIG. 4A shows an aerial view of a woven member coupled to a fishing lure connection mechanism.
Figure 4B:
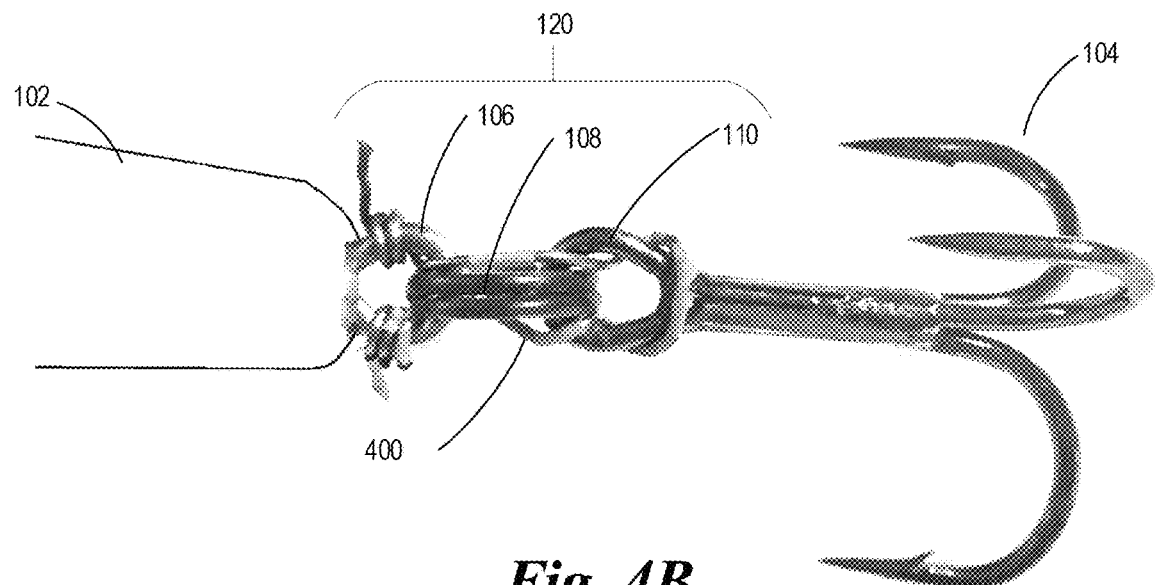
FIG. 4B shows a side view of a woven member coupled to a fishing lure connection mechanism.

FIG. 4A and FIG. 4B depict detailed views of a configuration that include a woven member 400, which aligns the fishing hook 104 with the lure body 102. The woven member 400 may be secured or intertwined with any combination of the lure loop segment 106, connector ring 108, hook loop segment 110, and/or any other connecting member between the lure body 102 and the fishing hooks 104.

As shown in FIG. 4A and FIG. 4B, the woven member 400 may be connected to the lure loop segment 106, connector ring 108, and hook loop segments 110 by first coiling a first end of the woven member 400 to the lure loop segment 106, and then passing the rest of the woven member 400 through the connector ring 108, through the hook loop segment 110, and back through the connector ring 108, before finally coiling a second end of the woven member 400 to the lure loop segment 106 to establish and secure alignment. Instead of coiling, the woven member 400 may be secured by adhesive, welding, soldering, or otherwise. In other configurations, the first end of the woven member 400 may be first secured to the connector ring 108 or the hook loop segment 110. The woven member 400 may extend through fewer components of the connection mechanism or may only be woven in one direction without being woven back in the opposite direction.

The woven member 400 may comprise of any pliable elongated member that can hold the components in a set position relative to each other. For example, the woven member 400 may be comprised of one or more of the following materials: wire, string, rope, thread, coil, fiber, and/or other pliable elongated materials.

While the Figures displayed herein all depict the fishing hooks as attached to a fishing lure, in some configurations, the present invention may comprise of an alignment kit. Such alignment kit would include an alignment member, such as the encasing member 200 or woven member 400, as well as any additional instructions, devices, parts, or tools that may assist in aligning a fishing hook 104 to a lure body 102.

For example, an alignment kit that includes an encasing member 102 may also include instructions, shoo-goo/liquid, silicone, glue, or any other liquid that dries semi-pliably, as well as tools for preparation, application, and/or removal. The alignment kit may include cups and spatulas for mixing liquid encasing components, hot glue guns, heat applicators for shrink wrap materials, and/or scissors or blades for cutting through silicone. The alignment kit may also include pliers or other tools to separate and reattach the lure loop segment 106, connector ring 108, and hook loop segment 110.

An alignment kit that includes a woven member 400 may also include instructions, tools to crimp wire or otherwise apply the woven member 400, as well as tools to disassemble/reassemble the setup between the woven member 400 and a lure. An alignment kit may also include lures, fishing hooks, and/or any connecting members to be used between the lure and fishing hook. The alignment kit may include split rings, swivels, spacers, and/or clevises. The alignment kit may also include a variety of hooks of different shapes and sizes. The alignment kit may include wire, rope, coil, and/or other pliable elongated materials. The alignment kit may further include pliers and/or tweezers for securing the woven member 200 to the connection mechanism 120.

Terminology

Although the connection mechanisms are described herein as having lure loop segments 106, connector rings 108, and hook loop segments 110, the connection mechanisms may have fewer or more components or the components may have a different configuration. For example, the hook loop segment 110 may directly connect to the lure loop segment 106. The lure loop segment 106 may comprise an eye hook embedded in the lure body 102 or may simply be a hole in the lure body 102. The connector ring 108 may instead be a split ring, swivel, spacer, and/or clevis.

Although certain embodiments and examples have been described herein, it will be understood by those skilled in the art that many aspects of the delivery systems shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Phrases preceded by a term such as "substantially" include the recited phrase and should be interpreted based on the circumstances (e.g., as much as reasonably possible under the circumstances). For example, "substantially aligned" includes "aligned."

What is claimed is:

1. A method of aligning a first fishing treble hook connected to a fishing lure with a first connection at a tail end of the fishing lure and a second fishing treble hook connected to a bottom side of the fishing lure with a second connection comprising a plurality of loops extending between the second fishing treble hook and the bottom side of the fishing lure, the method comprising:
    positioning the first fishing treble hook substantially parallel to a longitudinal axis of the fishing lure and at the tail end of the fishing lure;
    fixing the first fishing treble hook to the fishing lure in the position substantially parallel to the longitudinal axis of the fishing lure and at the tail end of the fishing lure, comprising:
        encasing the first connection between the first fishing treble hook and the fishing lure with a first heat shrink tubing, and
        applying heat to the first heat shrink tubing to fix the first connection and the first fishing treble hook in the position substantially parallel to the longitudinal axis of the fishing lure and at the tail end of the fishing lure;
    positioning the second fishing treble hook substantially parallel to the longitudinal axis of the fishing lure and spaced away from the bottom side of the fishing lure by positioning the second connection in a curved configuration where the plurality of loops extend along a curved path from the bottom side of the fishing lure to the second fishing treble hook;
    fixing the second fishing treble hook to the bottom side of the fishing lure in the position substantially parallel to the longitudinal axis of the fishing lure and spaced away from the bottom side of the fishing lure, comprising:
        encasing the second connection extending between the second fishing treble hook and the bottom side of the fishing lure with a second heat shrink tubing;
        applying heat to the second heat shrink tubing to fix the second connection in the curved configuration such that the second fishing treble hook is fixed in the position substantially parallel to the longitudinal axis of the fishing lure and spaced away from the bottom side of the fishing lure;
    wherein the first and second connections and the first and second fishing treble hooks are substantially unable to move relative to the fishing lure when the first and second fishing treble hooks are fixed to the fishing lure.

2. The method of claim 1, wherein the first connection connecting the first fishing treble hook to the fishing lure comprises a connector ring.

3. The method of claim 1, wherein the second fishing treble hook is connected to the bottom side of the fishing lure with the second connection between a front end and the tail end of the fishing lure.

4. The method of claim 1, wherein the positioning the first fishing treble hook substantially parallel to the longitudinal axis of the fishing lure further comprises aligning a longitudinal axis of the first fishing treble hook along the longitudinal axis of the fishing lure.

5. The method of claim 1, wherein the first heat shrink tubing and the second heat shrink tubing each comprises polyolefin, fluoropolymer, PVC, neoprene, or silicone elastomer.

* * * * *